United States Patent [19]
Slaven

[11] Patent Number: 5,997,092
[45] Date of Patent: Dec. 7, 1999

[54] SYSTEM FOR ADJUSTING VERTICAL HEIGHT OF AN ARMREST

[75] Inventor: John P. Slaven, Harper Woods, Mich.

[73] Assignee: Lear Corporation, Southfield, Mich.

[21] Appl. No.: 08/910,455

[22] Filed: Aug. 5, 1997

[51] Int. Cl.$^6$ .................................................. A47C 7/54
[52] U.S. Cl. .............. 297/411.36; 297/115; 297/188.14; 297/188.01; 297/188.19; 297/188.07; 296/37.1; 224/281
[58] Field of Search .................................. 296/37.1, 37.8, 296/37.15; 297/115, 188.01, 188.07, 188.14, 188.15, 188.16, 188.19, 411.31, 411.36; 224/275, 281, 539

[56] References Cited

U.S. PATENT DOCUMENTS

| | | | |
|---|---|---|---|
| 3,338,629 | 8/1967 | Dress | 297/194 |
| 4,619,478 | 10/1986 | Heimnick et al. | 296/153 |
| 4,674,790 | 6/1987 | Johnson | 296/153 |
| 5,012,613 | 5/1991 | Sekine | 49/362 |
| 5,375,805 | 12/1994 | Sudak et al. | 248/311.2 |
| 5,639,002 | 6/1997 | Weitbrecht et al. | 224/539 |
| 5,845,965 | 12/1998 | Heath et al. | 297/188.19 |

FOREIGN PATENT DOCUMENTS 404024133  1/1992  Japan ..................................... 224/275

*Primary Examiner*—D. Glenn Dayoan
*Assistant Examiner*—Paul Chenevert
*Attorney, Agent, or Firm*—Brooks & Kushman P.C.

[57] ABSTRACT

A motorized system is provided for adjusting the vertical height of a container within a base located between front seats of a motor vehicle. A flap which is used as an armrest is pivotally mounted on the housing to close a top opening of the housing. A linear drive linearly moves the container relative to the base along a vertical axis. A positioning drive including a reversible electrical motor has a rotary driveshaft for applying motion to the linear drive. A power transmission in the form of a flexible shaft is coupled to the driveshaft of the motor and a pair of worm gears is coupled to the linear drive. A manually operable switch is provided for selectively coupling the electrical power to the electrical motor to cause the driveshaft to rotate in a desired direction to position the linear drive which, in turn, linearly positions the container within the base.

2 Claims, 2 Drawing Sheets

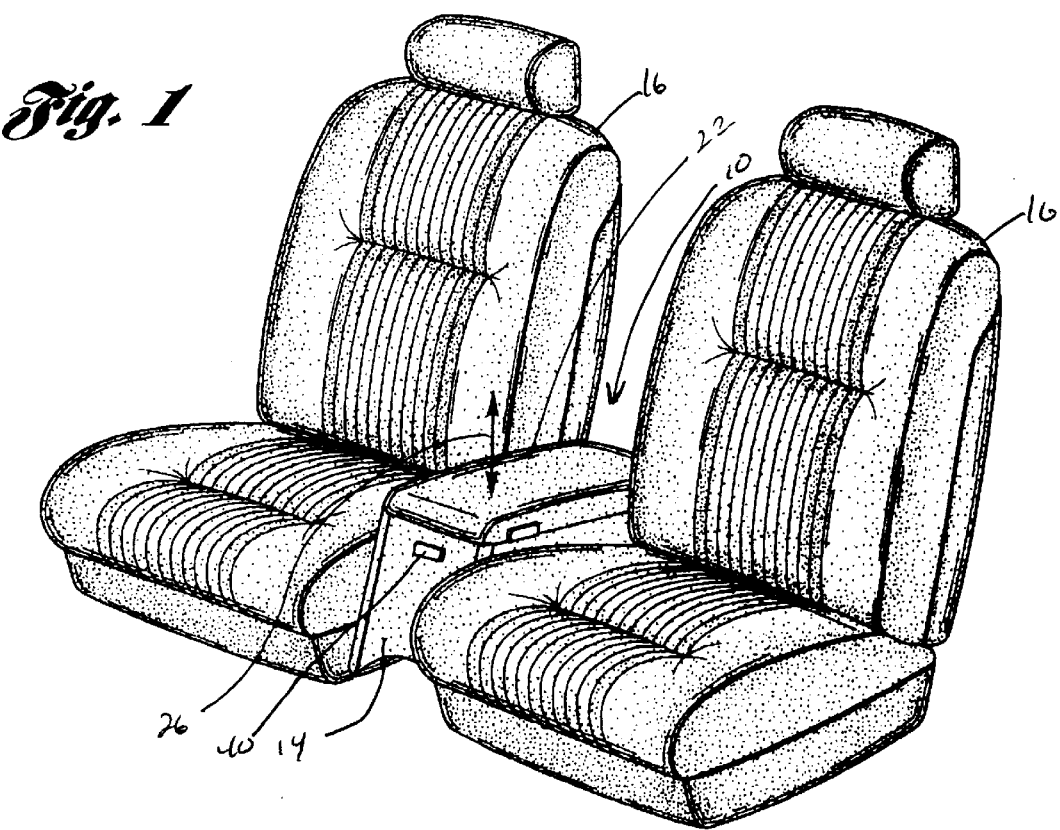
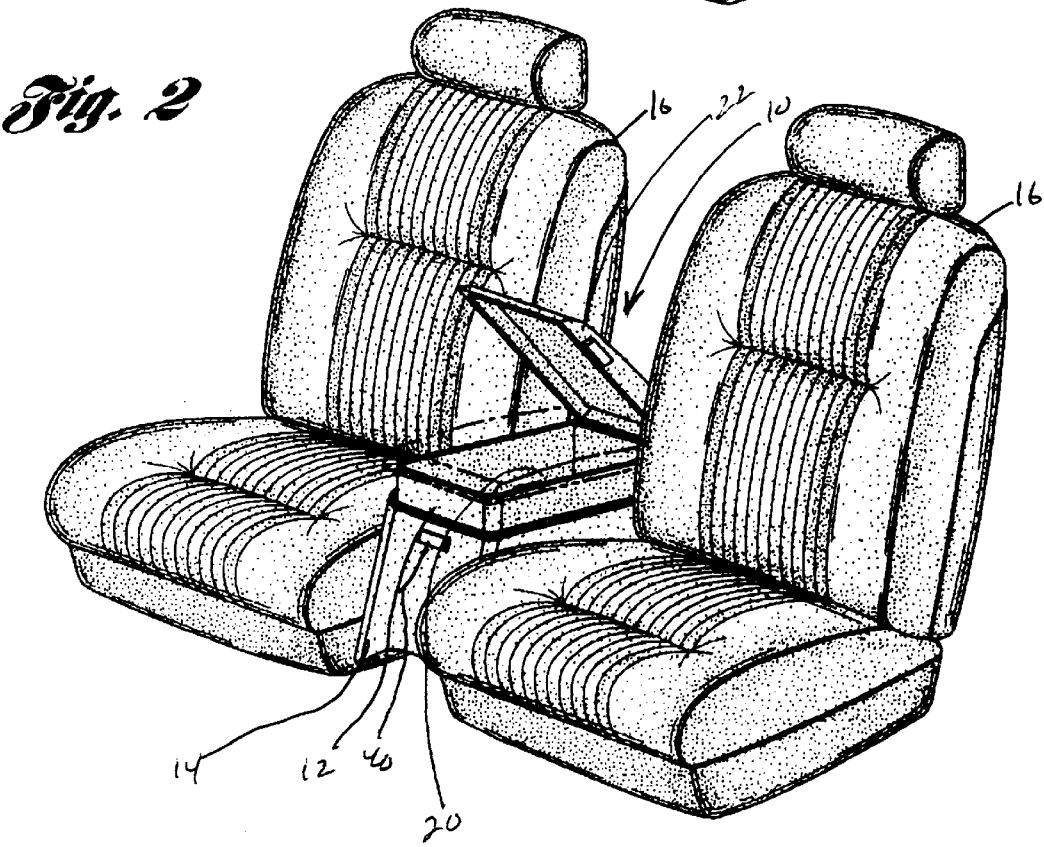

SYSTEM FOR ADJUSTING VERTICAL HEIGHT OF AN ARMREST

TECHNICAL FIELD

This invention relates to systems for adjusting vertical height of an armrest and, in particular, to systems for adjusting vertical height of a container having a housing positioned within a base located between front seats of a motor vehicle wherein the armrest is a flap utilized in closing and opening of the housing.

BACKGROUND ART

U.S. Pat. No. 5,639,002 discloses a coverable container for a vehicle having a box-like opening which is open towards the top and a flap or cover which can be pivoted on the housing and is designed as an armrest for a seat occupant. The flap provides a vertically adjustable armrest in that a support lever is articulated on the underside of the flap at a distance from the pivot axis of the flap which supports the lever by means of a latching lug.

A problem with such a vertically adjustable armrest is that the adjustable flap may not support a large amount of weight (i.e., 200–250 pounds) in its adjusted state.

SUMMARY OF THE INVENTION

An object of the present invention is to provide a system for adjusting the vertical height of a container including a housing and a flap which is used as an armrest movably mounted on the housing and which container can support a relatively large amount of weight in a reliable fashion.

In carrying out the above object and other objects of the present invention, a system is provided for adjusting vertical height of a container having a box-like housing positioned within a base located between front seats of a motor vehicle. The motor vehicle has a source of electrical power. The housing has an opening toward a top thereof and a flap for use as an armrest movably mounted on the housing to close the opening of the housing. The system includes a linear drive for linearly moving the container relative to the base along a vertical axis. The system also includes a positioning drive including a reversible electrical motor having a rotary driveshaft for applying motion to the linear drive. The system further includes a power transmission for coupling the rotary driveshaft to the linear drive to convert the rotary motion of the driveshaft to linear motion of the linear drive. Finally, the system includes a device for selectively coupling the electrical power to the electrical motor to cause the driveshaft to rotate in a desired direction to position the linear drive which, in turn, linearly positions the container within the base.

Preferably, the power transmission includes a flexible shaft coupled to the driveshaft and a pair of worm gears coupled to the linear drive.

Also, preferably, the device for electrically coupling the electrical power to the electrical motor is a switch.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is an environmental, perspective view illustrating a container having a box-like housing or bin positioned within a base located between front seats of a motor vehicle;

FIG. 2 is a view similar to FIG. 1 with a flap of the container in an open position and the housing of the container in a vertically extended position;

BEST MODE FOR CARRYING OUT THE INVENTION

Figure 3:
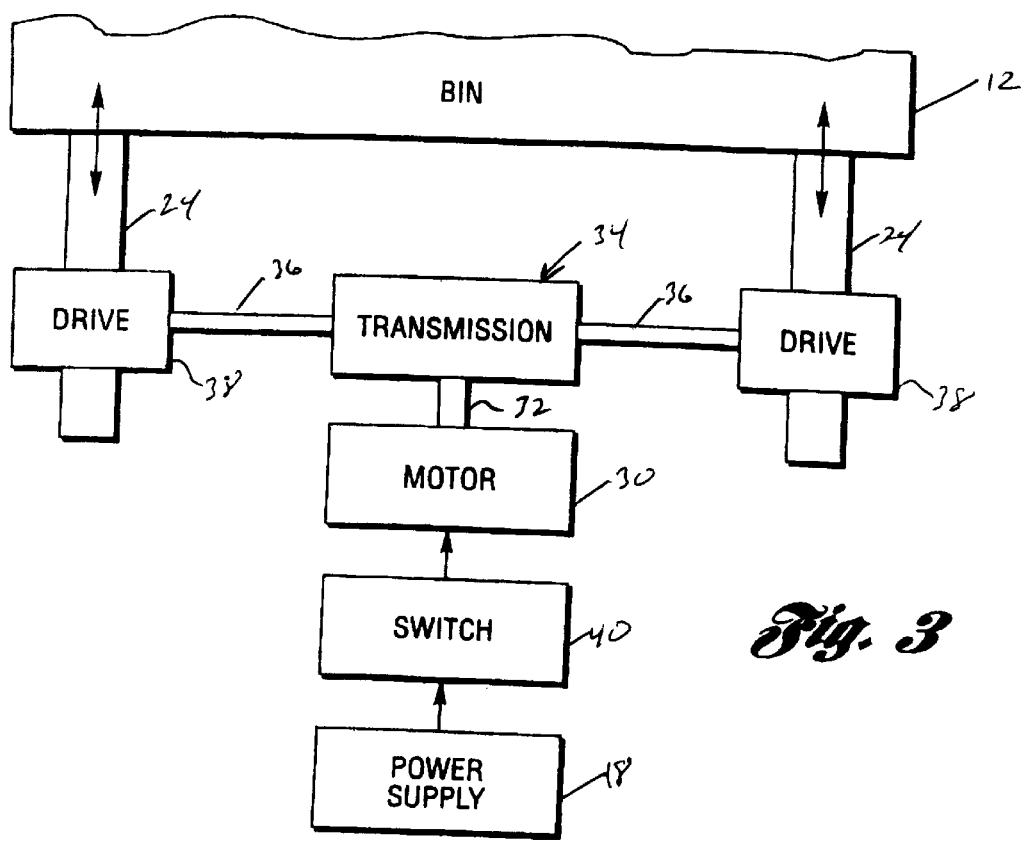
FIG. 3 is a block diagram, partially broken away, of a system of the invention connected to the bin.

Referring now to FIGS. 1 and 2, there is illustrated a container, generally indicated at 10, having a box-like housing 12 positioned within a base 14 located between front seats 16 of a motor vehicle. The motor vehicle typically has a source of electrical power located thereon such as a battery 18 (FIG. 3). The housing 12 has an opening 20 toward a top surface thereof and a flap 22 for use as an armrest pivotally mounted on the housing 12 to close the opening 20 of the housing 12.

Figure 4:
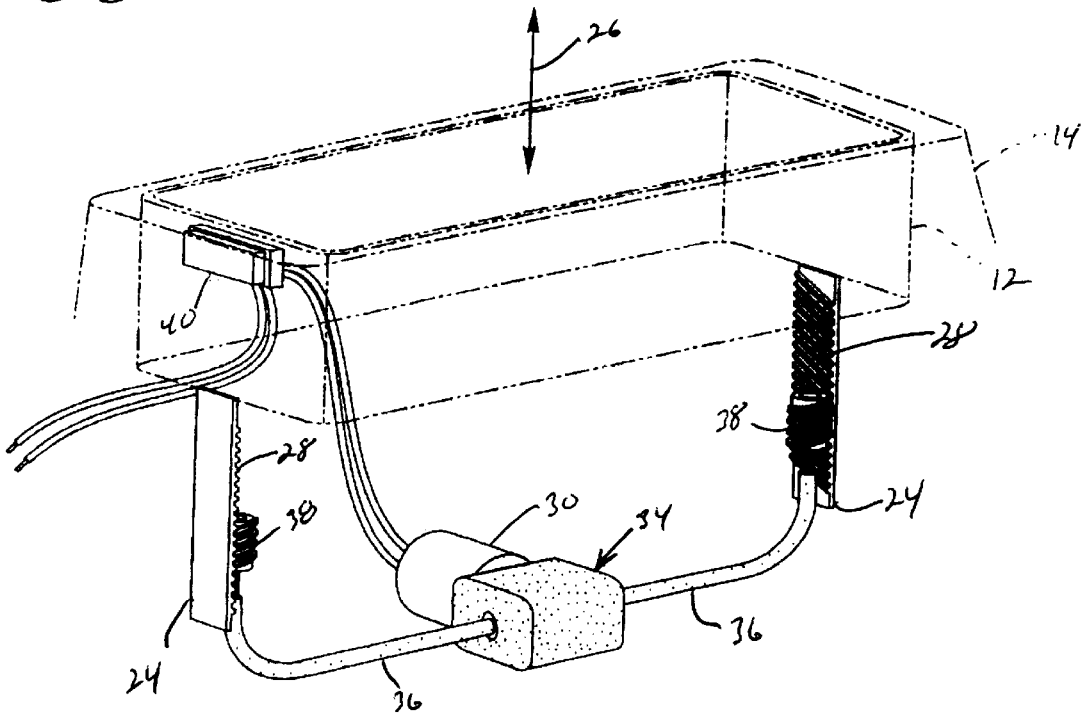
FIG. 4 is a schematic view of the system for adjusting the vertical height of the container shown relative to its base, both of which are illustrated by phantom lines.

Referring now to FIGS. 3 and 4, there is illustrated a system for adjusting the vertical height of the container 10. The system includes a linear drive such as a pair of posts 24 connected to the housing 12 for linearly moving the container 10 relative to the base 14 along a vertical axis 26. The posts 24 have grooves 28 formed therein.

The system also includes a positioning drive including a reversible electrical motor 30 having a rotary driveshaft 32 for applying motion to the linear drive.

The system also includes a power transmission, generally indicated at 34, including a flexible shaft 36 coupled to the driveshaft 32 of the motor 30 and a pair of worm gears 38 coupled thereto and to the grooves 28 in the posts 24 of the linear drive to convert rotary motion of the driveshaft 32 to linear motion of the drive posts 24.

The system also includes a device in the form of a manually operable switch 40 for selectively coupling the electrical power to the electrical motor 30 to cause the driveshaft 32 to rotate in a desired direction to position the linear drive which, in turn, linearly positions the container 12 within the base 14.

A guide mechanism (not shown) may be provided on either the container 10 and/or the base 14 to guide the linear motion of the container 12 as it moves relative linearly to the base 14.

While the best mode for carrying out the invention has been described in detail, those familiar with the art to which this invention relates will recognize various alternative designs and embodiments for practicing the invention as defined by the following claims.

What is claimed is:

1. A system for adjusting vertical height of a container having a box-like housing positioned within a base located between front seats of a motor vehicle having a source of electrical power, the housing having an opening toward a top thereof and a flap for use as an armrest movably mounted on the housing to close the opening of the housing, the system comprising:

a linear drive for linearly moving the container relative to the base along a vertical axis;

a positioning drive including a reversible electrical motor having a rotary driveshaft for applying motion to the linear drive;

a power transmission including a flexible shaft coupled to the driveshaft at a central portion thereof to rotate therewith and a pair of gears coupled at opposite ends of the flexible shaft to rotate therewith, each of the gears having teeth which mesh with the positioning drive at a pair of spaced apart locations for coupling the rotary driveshaft to the linear drive to convert rotary motion of the driveshaft to linear motion of the linear drive; and a device for selectively coupling the electrical power to the electrical motor to cause the driveshaft to rotate in a desired direction to position the linear drive which, in turn, linearly positions the container within the base.

2. The system as claimed in claim 1 wherein the device is a manually operable switch.

* * * * *